(12) United States Patent
Suto

(10) Patent No.: US 8,592,092 B2
(45) Date of Patent: Nov. 26, 2013

(54) BATTERY

(75) Inventor: Koji Suto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/510,798

(22) PCT Filed: Dec. 9, 2009

(86) PCT No.: PCT/JP2009/070609

§ 371 (c)(1),
(2), (4) Date: Jun. 6, 2012

(87) PCT Pub. No.: WO2011/070658

PCT Pub. Date: Jun. 16, 2011

(65) Prior Publication Data

US 2012/0264025 A1   Oct. 18, 2012

(51) Int. Cl.
*H01M 10/02* (2006.01)

(52) U.S. Cl.
USPC ............. 429/405; 429/101; 429/46; 429/204; 429/206; 429/304

(58) Field of Classification Search
USPC ............................... 429/1–347, 405
See application file for complete search history.

(56) References Cited

U.S. PATENT DOCUMENTS 7,344,801 B2 *   3/2008   Cheng et al. ................. 429/101

FOREIGN PATENT DOCUMENTS

| JP | A-04-101358 | 4/1992 |
|---|---|---|
| JP | A-2007-524204 | 8/2007 |
| WO | WO 2005/083829 A2 | 9/2005 |

OTHER PUBLICATIONS

Haoshen Zhou et al., "Development of a New-type Lithium-Air Battery with Large Capacity," Feb. 24, 2009. National Institute of Advanced Industrial Science and Technology. Online. (with translation).
Jan. 12, 2010 International Search Report issued in Patent Application No. PCT/JP2009/070609.
U.S. Appl. No. 13/960,685 to Koji Suto, filed Aug. 6, 2013.
Sep. 30, 2013 Notice of Allowance issued in U.S. Appl. No. 13/960,685.

* cited by examiner

*Primary Examiner* — Milton I Cano
*Assistant Examiner* — Ling R Zeng
(74) *Attorney, Agent, or Firm* — Oliff & Berridge, PLC

(57) ABSTRACT

Provided is a battery which can prevent deactivation from occurring by avoiding solid deposition at electrodes. The battery includes an anion conductor, a positive electrode, a negative electrode, a first aqueous liquid electrolyte layer and a second aqueous liquid electrolyte layer, wherein the first aqueous liquid electrolyte layer and the positive electrode are present in this sequence on a first surface of the anion conductor, and the second aqueous liquid electrolyte layer and the negative electrode are present in this sequence on a second surface of the anion conductor, and wherein the negative electrode includes a negative electrode active material layer, and the negative electrode active material layer includes a negative electrode active material which can release a metal ion upon discharging.

4 Claims, 2 Drawing Sheets

BATTERY

TECHNICAL FIELD

The present invention relates to a battery which can prevent deactivation from occurring by avoiding solid deposition at electrodes.

BACKGROUND ART

A metal-air battery is a rechargeable battery using metal (such as lithium) as the negative electrode active material and oxygen as the positive electrode active material. The positive electrode active material, oxygen, can be obtained from the air, so that it is not needed to encapsulate the positive electrode active material in the battery. In theory, therefore, the metal-air battery can provide a larger capacity than a secondary battery using a solid positive electrode active material.

In the metal-air battery, the reaction described by the following formula (1) proceeds at the negative electrode upon discharging:

$$2Li \rightarrow 2Li^+ + 2e^- \quad (1)$$

Electrons generated by the formula (I) pass through an external circuit, work by an external load, and then reach the positive electrode. Lithium ions (Li+) generated by the formula (I) are transferred by electro-osmosis from the negative electrode side to the positive electrode side through an electrolyte sandwiched between the negative and positive electrodes.

Upon discharging the battery, the reactions described by the following formulae (2) and (3) proceed at the positive electrode:

$$2Li^+ + O_2 + 2e^- \rightarrow Li_2O_2 \quad (2)$$

$$2Li^+ + \tfrac{1}{2}O_2 + 2e^- \rightarrow Li_2O \quad (3)$$

The thus-produced lithium peroxide ($Li_2O_2$) and lithium oxide ($Li_2O$) are stored in the air electrode as a solid.

Upon charging the battery, a reaction which is reverse to the reaction described by the formula (1) proceeds at the negative electrode, while reactions which are reverse to the reactions described by the formulae (2) and (3) proceed at the positive electrodes. Lithium metal is thus regenerated at the positive electrode. Because of this, discharge becomes possible again.

In conventional metal-air batteries, a solid product comprising lithium peroxide ($Li_2O_2$) and lithium oxide ($Li_2O$), which are reaction products of the above formulae (2) and (3), is deposited in the air electrode. As a result, the air electrode is clogged up with the solid product to block the contact between the air and a liquid electrolyte, resulting in a problem with charge and discharge.

As a lithium-air battery technique for solving such a solid deposition in the air electrode, Non-Patent Literature 1 discloses a technique for preventing lithium oxide ($Li_2O$), which is a solid reaction product in the air electrode, from deposition by providing an organic liquid electrolyte between the negative electrode and a lithium ion-conducting solid electrolyte, and an aqueous liquid electrolyte between the air electrode and the solid electrolyte.

CITATION LIST

Non-Patent Literature 1: Haoshen Zhou et al., "Development of a New-type Lithium-Air Battery with Large Capacity" [online], Feb. 24, 2009, National Institute of Advanced Industrial Science and Technology, searched on Dec. 9, 2009 on the Internet (URL: http://www.aist.go.jp/aist_j/press_release/pr2009/pr20090224/pr20090224.html)

SUMMARY OF INVENTION

Technical Problem

In the lithium-air battery disclosed in the non-patent literature, it is described that the reaction described by the following formula (4) proceeds at the negative electrode upon discharge:

$$Li \rightarrow Li^+ e^- \quad (4)$$

According to the formula (4), lithium metal Li is dissolved in an organic liquid electrolyte in the form of lithium ion $Li^+$, and an electron is supplied to a lead. The dissolved lithium ion $Li^+$ transfers to the aqueous liquid electrolyte at the positive electrode through the solid electrolyte.

On the other hand, in the lithium-air battery, it is described that the reaction described by the following formula (5) proceeds at the positive electrode upon discharging:

$$O_2 + 2H_2O + 4e^- \rightarrow 4OH^- \quad (5)$$

According to the formula (5), electrons are supplied from a lead, and on the surface of the air electrode, water reacts with oxygen in the air to produce hydroxide ions $OH^-$. In the aqueous liquid electrolyte on the air electrode side, the hydroxide ions meet the lithium ion produced in the formula (4) to become water-soluble lithium hydroxide LiOH.

As described above, the lithium-air battery disclosed in Non-Patent Literature 1 aims to prevent salt deposition by dissolving lithium hydroxide LiOH, which is a salt produced by electrode reaction, in the aqueous liquid electrolyte provided between the lithium ion-conducting solid electrolyte and the air electrode. In Non-Patent Literature 1, however, the saturation solubility of salt in the aqueous liquid electrolyte is not considered at all, so that in the case where the concentration of the lithium hydroxide is more than the saturation solubility, lithium hydroxide deposition is expected to be started. Therefore, the lithium-air battery disclosed in Non-Patent Literature 1 is not considered as an invention which can sufficiently resolve the problems that are needed to be solved.

The present invention was achieved in view of the above circumstance. An object of the present invention is to provide a battery which can prevent deactivation from occurring by avoiding solid deposition at electrodes.

Solution to Problem

The battery of the present invention is a battery comprising an anion conductor, a positive electrode, a negative electrode, a first aqueous liquid electrolyte layer and a second aqueous liquid electrolyte layer, wherein the first aqueous liquid electrolyte layer and the positive electrode are present in this sequence on a first surface of the anion conductor, and the second aqueous liquid electrolyte layer and the negative electrode are present in this sequence on a second surface of the anion conductor, and wherein the negative electrode comprises a negative electrode active material layer, and the negative electrode active material layer comprises a negative electrode active material which can release a metal ion upon discharging.

In such a battery, by the anion conductor present between the positive and negative electrodes, it is possible to prevent the metal ions released from the negative electrode active material layer upon discharge, from reaching the positive electrode. Therefore, a metal salt derived from the metal ions is not mixed with the first aqueous liquid electrolyte layer, and it is thus possible to prevent metal salt deposition in the positive electrode. Also in such a battery, because there is no possibility of metal salt deposition, it is possible to increase the energy density per volume of the battery by controlling the salt concentration of the first aqueous liquid electrolyte layer and that of the second aqueous liquid electrolyte layer.

An embodiment of the battery of the present invention is that a first solid electrolyte with cation-conducting and non-anion-conducting properties is present between the second aqueous liquid electrolyte layer and the negative electrode.

In such a battery, by the first solid electrolyte, it is possible to prevent an anion released from the positive electrode upon discharge from reaching the negative electrode. Therefore, it is possible to prevent a metal salt produced from the metal ions and anions from depositing in the negative electrode.

A different embodiment of the battery of the present invention is that a third aqueous liquid electrolyte layer is present between the first solid electrolyte and the negative electrode.

In such a battery, by the first solid electrolyte, it is possible to prevent an anion released from the positive electrode upon discharge from reaching the negative electrode. Therefore, a metal salt produced from the metal ions and anions is not mixed with the third aqueous liquid electrolyte layer, and it is thus possible to prevent the metal salt from depositing in the negative electrode.

A different embodiment of the battery of the present invention is that a second solid electrolyte and a non-aqueous liquid electrolyte layer are present in this sequence between the second aqueous liquid electrolyte layer and the negative electrode, the second solid electrolyte being selected from the group consisting of a solid electrolyte with cation-conducting and non-anion-conducting properties and a solid electrolyte with cation-conducting and anion-conducting properties.

In such a battery, an anion released from the positive electrode upon discharge can only be present at an extremely low concentration in the non-aqueous liquid electrolyte layer. Therefore, a metal salt produced from the metal ions and anions is not mixed with the non-aqueous liquid electrolyte layer, and it is thus possible to prevent the metal salt from depositing in the negative electrode.

A different embodiment of the battery of the present invention is that the battery is a metal-air battery.

A different embodiment of the battery of the present invention is that the negative electrode active material layer comprises lithium as the negative electrode active material, and the positive electrode comprises a positive electrode active material layer, and the positive electrode active material layer comprises copper as the positive electrode active material.

In such a battery, lithium and copper, which is a combination with a large difference in standard electrode potential, is used as the electrodes. Therefore, a high voltage can be obtained.

Advantageous Effects of Invention

According to the present invention, by the anion conductor present between the positive and negative electrodes, it is possible to prevent the metal ions released from the negative electrode active material layer upon discharge, from reaching the positive electrode. Therefore, a metal salt derived from the metal ions is not mixed with the first aqueous liquid electrolyte layer, so that it is possible to prevent metal salt deposition in the positive electrode. Also according to the present invention, because there is no possibility of metal salt deposition, it is possible to increase the energy density per volume of the battery by controlling the salt concentration of the first aqueous liquid electrolyte layer and that of the second aqueous liquid electrolyte layer.

DESCRIPTION OF EMBODIMENTS

Figure 1:
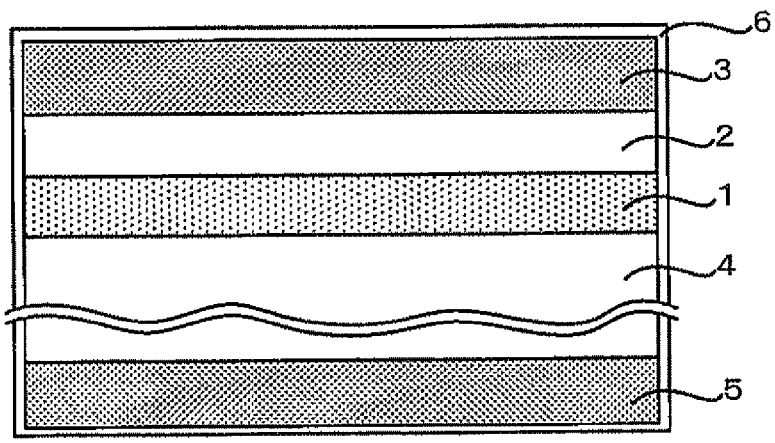
FIG. 1 is a schematic sectional view of a typical structure of the battery of the present invention.

The battery of the present invention is a battery comprising an anion conductor, a positive electrode, a negative electrode, a first aqueous liquid electrolyte layer and a second aqueous liquid electrolyte layer, wherein the first aqueous liquid electrolyte layer and the positive electrode are present in this sequence on a first surface of the anion conductor, and the second aqueous liquid electrolyte layer and the negative electrode are present in this sequence on a second surface of the anion conductor, and wherein the negative electrode comprises a negative electrode active material layer, and the negative electrode active material layer comprises a negative electrode active material which can release a metal ion upon discharging.

The air-metal battery disclosed in the above-mentioned Non-Patent Literature 1 comprises a gas diffusion electrode which reduces oxygen, a lithium metal as the negative electrode, an alkali aqueous solution as the liquid electrolyte on the positive electrode side, and a lithium ion-permeable wall between the negative electrode and the liquid electrolyte.

As described above, for such a battery using a conventional aqueous liquid electrolyte, no consideration is given to the saturation solubility of a metal salt in the aqueous liquid electrolyte, at all. In the state that the concentration of the metal salt in the aqueous liquid electrolyte (for example, a lithium salt) is more than the saturated condition of the aqueous liquid electrolyte, salt crystal-producing nuclei are formed in a part with relatively high energy, such as a surface of a solid such as an air electrode or an inner wall of a battery. If, inside the battery, the atmosphere condition necessary for crystal growth is uniform, salt crystals are likely to be deposited particularly on a surface of the air electrode. In the part where such solid crystal formation is shown, all air- and ion-conducting paths are absolutely blocked. In conventional metal-air batteries, as just described, solid crystals formed in the air electrode could deactivate the battery.

A main characteristic of the battery of the present invention is that the first aqueous liquid electrolyte layer on the positive electrode side and the second aqueous liquid electrolyte layer on the negative electrode side are kept away from each other by the anion conductor. By providing the anion conductor in this way, it is possible to prevent metal ions released from the negative electrode active material layer upon discharge, from reaching the positive electrode. Therefore, a metal salt derived from the metal ions is not mixed with the first aqueous liquid electrolyte layer, so that it is possible to prevent metal salt deposition in the positive electrode. Because there is no possibility of such metal salt deposition, it is possible to increase the energy density per volume of the battery by controlling the salt concentration of the first aqueous liquid electrolyte layer and that of the second aqueous liquid electrolyte layer.

Hereinafter, a typical structure of the present invention will be described. FIG. 1 is a schematic sectional view of a typical structure of the battery of the present invention. A double wavy line shown in the figure indicates that a part of the figure is omitted. The present invention is not limited to this typical structure.

As shown in FIG. 1, first aqueous liquid electrolyte layer 2 and positive electrode 3 are present in this sequence on a first surface of anion conductor 1, and second aqueous liquid electrolyte layer 4 and negative electrode 5 are present in this sequence on a second surface of anion conductor 1. To retain the aqueous liquid electrolyte layers, it is preferable that battery case 6 houses the battery of the present invention.

Anion conductor 1 permeates anions released from positive electrode 3, such as hydroxide ions; however, it does not permeate metal ions released from negative electrode 5, that is, cations. Accordingly, the anions released from positive electrode 3 are immediately transfers to second aqueous liquid electrolyte layer 4 and meet the metal ions to form a metal salt. The metal salt is dissolved or deposited in second aqueous liquid electrolyte layer 4.

In the present invention, as just described, no metal salt is formed in or around the positive electrode, so that the positive electrode is not covered with a metal salt. Especially in the case of a metal-air battery in which the positive electrode is an air battery, no metal salt is formed inside the air electrode, which is porous, so that the air electrode is not clogged up and stable power generation is possible. Also in the battery of the present invention, because no metal salt is deposited in the positive electrode, it is possible to fully utilize the active material amount contained in the negative electrode active material layer in the negative electrode and thus to increase the discharging capacity further than ever before.

Hereinafter, four typical examples will be described, each of which uses the layer structure shown in FIG. 1.

Figure 2:
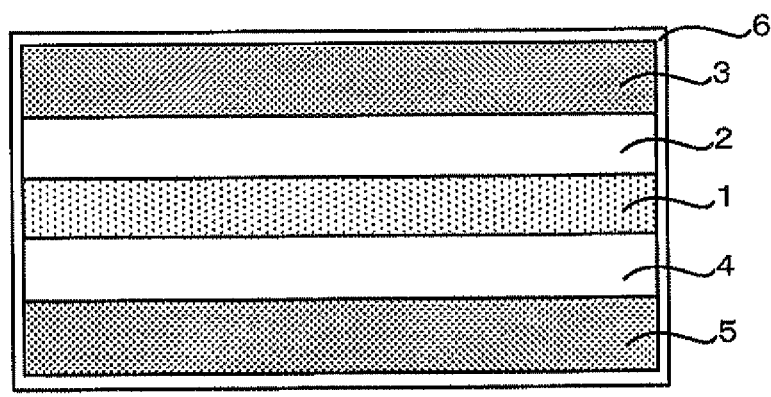
FIG. 2 is a schematic sectional view of the first typical example of the battery of the present invention.

FIG. 2 is a schematic sectional view of the first typical example of the battery of the present invention. In this first typical example, first aqueous liquid electrolyte layer 2 and positive electrode 3 are present in this sequence on a first surface of anion conductor 1, and second aqueous liquid electrolyte layer 4 and negative electrode 5 are present in this sequence on a second surface of anion conductor 1. Second aqueous liquid electrolyte layer 4 is in direct contact with negative electrode 5. To retain the aqueous liquid electrolyte layers, it is preferable that battery case 6 houses the battery of the present invention.

In the first typical example, metal ions released from negative electrode 5 do not pass through anion conductor 1. A metal salt derived from the metal ions is all dissolved or deposited in second aqueous liquid electrolyte layer 4, so that first aqueous liquid electrolyte layer 2 is not contaminated with the metal ions; moreover, the metal ions are not deposited in the positive electrode.

In the first typical example, second aqueous liquid electrolyte layer 4 is in direct contact with negative electrode 5; therefore, those usable as the negative electrode active material in negative electrode 5 include Group 2 elements such as magnesium and calcium, Group 13 elements such as aluminum, transition metals such as zinc, iron, copper and nickel, and alloys and compounds containing these metals and elements which have low reactivity with water.

Figure 3:
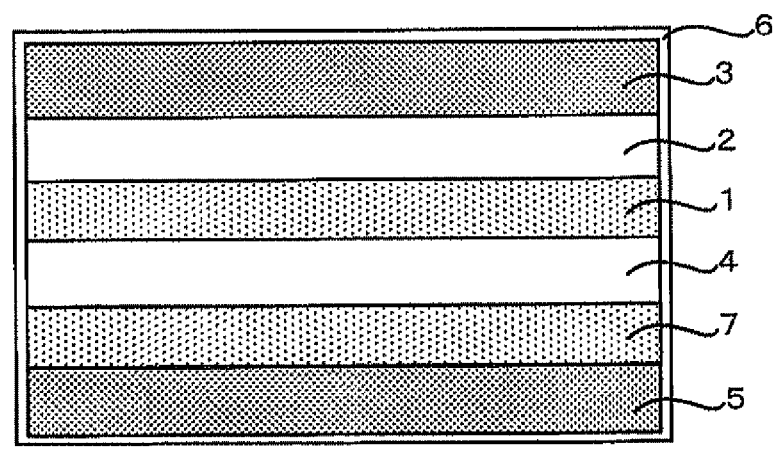
FIG. 3 is a schematic sectional view of the second typical example of the battery of the present invention.

FIG. 3 is a schematic sectional view of the second typical example of the battery of the present invention. In this second typical example, first aqueous liquid electrolyte layer 2 and positive electrode 3 are present in this sequence on a first surface of anion conductor 1, and second aqueous liquid electrolyte layer 4 and negative electrode 5 are present in this sequence on a second surface of anion conductor 1; moreover, first solid electrolyte 7 with cation-conducting and non-anion-conducting properties is present between second aqueous liquid electrolyte layer 4 and negative electrode 5. To retain the aqueous liquid electrolyte layers, it is preferable that battery case 6 houses the battery of the present invention.

In the battery of such a structure, by anion conductor 1, it is possible to prevent the metal ions released from negative electrode 5 upon discharge, from reaching positive electrode 3; moreover, by first solid electrolyte 7, it is possible to prevent the anions released from positive electrode 3 upon discharge, from reaching negative electrode 5, so that no metal salt produced from the metal ions and anions is dissolved or deposited in first aqueous liquid electrolyte layer 2, and it is thus possible to prevent metal salt deposition in positive electrode 3 and negative electrode 5.

In the second typical example, second aqueous liquid electrolyte layer 4 and negative electrode 5 are kept away from each other by first solid electrolyte 7. Therefore, those usable as the negative electrode active material in negative electrode 5 include, in addition to the above-mentioned metals with low reactivity with water, alkali metals such as lithium, sodium and potassium, which have high reactivity with water and are likely to cause self-discharge, and alloys and compounds containing the alkali metals.

As the first solid electrolyte with cation-conducting and non-anion-conducting properties, there may be mentioned a cation conductor, for example. As the cation conductor, there may be mentioned a solid electrolyte with lithium ion conductivity, for example.

Specific examples of the solid electrolyte with lithium ion conductivity include a solid oxide electrolyte, a solid sulfide electrolyte, a polymer electrolyte and a gel electrolyte.

Specific examples of the solid oxide electrolyte include lithium phosphorus oxynitride (LiPON), $Li_{1.3}Al_{0.3}Ti_{0.7}(PO_4)_3$, $La_{0.51}Li_{0.34}TiO_{0.74}$, $Li_3PO_4$, $Li_2SiO_2$ and $Li_2SiO_4$.

Specific examples of the solid sulfide electrolyte include $Li_2S$—$P_2S_5$($Li_2S$:$P_2S_5$=50:50~100:0), $Li_2S$—$SiS_2$, $Li_{3.25}P_{0.25}Ge_{0.76}S_4$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$-ZmSn (Z=Ge, Zn, Ga), $Li_2S$—$GeS_2$, $Li_2S$—$SiS_2$—$Li_3PO_4$, and $Li_2S$—$SiS_2$—$Li_xMO_y$ (M=P, Si, Ge, B, Al, Ga, In).

A polymer electrolyte contains a lithium salt and a polymer. The lithium salt is not particularly limited as long as it is one which is used for common lithium secondary batteries. For example, there may be mentioned $LiPF_6$, $LiBF_4$, $LiN(CF_3SO_2)_2$, $LiCF_3SO_3$, $LiC_4F_9SO_3$, $LiC(CF_3SO_2)_3$ and $LiClO_4$. The polymer is not particularly limited as long as it is one which can form a complex in combination with the lithium salt. For example, there may be mentioned polyethylene oxide.

A gel electrolyte contains a lithium salt, a polymer and a non-aqueous solvent. Those usable as the lithium salt include the above-mentioned lithium salts.

The non-aqueous solvent is not particularly limited as long as it can dissolve the above-mentioned lithium salts. For example, there may be mentioned propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolan, nitromethane, N,N-dimethylformamide, dimethylsulfoxide, sulfolane and γ-butyrolactone. These non-aqueous solvents can be used solely or in combination of two or more kinds in combination as a mixture. It is also possible to use a room temperature molten salt as the non-aqueous liquid electrolyte.

The polymer is not particularly limited as long as it can gelate. For example, there may be mentioned polyethylene oxide, polypropylene oxide, polyacrylonitrile, polyvinylidene fluoride (PVDF), polyurethane, polyacrylate and cellulose.

In addition to the solid electrolytes with lithium ion conductivity, those usable as the cation conductor include, for example, β alumina and NASICON ($Na_3Zr_2Si_2PO_{12}$), all of which are sodium ion conductors; ion-conductive glasses such as AgI, $Ag_2S$, $Ag_2Se$, $Ag_3SI$, $RbAg_4I_5$ and $AgSO_4 \cdot AgPO_3$, all of which are silver ion conductors; $Rb_4Cu_{16}I_7Cl_{13}$, $AgI \cdot xCu_xI$ and copper halides such as CuI, all of which are copper ion conductors.

Figure 4:
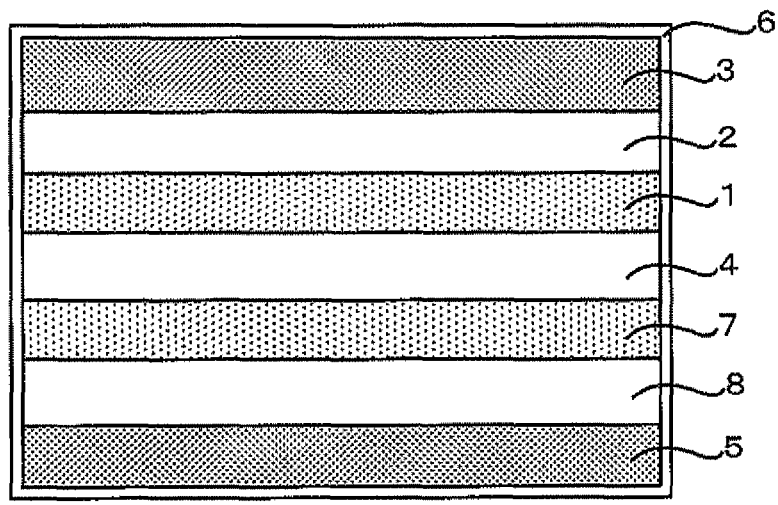
FIG. 4 is a schematic sectional view of the third typical example of the battery of the present invention.

FIG. 4 is a schematic sectional view of the third typical example of the battery of the present invention. In this third typical example, first aqueous liquid electrolyte layer 2 and positive electrode 3 are present in this sequence on a first surface of anion conductor 1, and second aqueous liquid electrolyte layer 4 and negative electrode 5 are present in this sequence on a second surface of anion conductor 1; moreover, first solid electrolyte 7 with cation-conducting and non-anion-conducting properties and third aqueous liquid electrolyte layer 8 are present in this sequence between second aqueous liquid electrolyte layer 4 and negative electrode 5. To retain the aqueous liquid electrolyte layers, it is preferable that battery case 6 houses the battery of the present invention.

In the battery of such a structure, by anion conductor 1, it is possible to prevent the metal ions released from negative electrode 5 upon discharge, from reaching positive electrode 3; moreover, by first solid electrolyte 7, it is possible to prevent the anions released from positive electrode 3 upon discharge, from reaching negative electrode 5, so that no metal salt produced from the metal ions and anions is dissolved or deposited in first aqueous liquid electrolyte layer 2 and third aqueous liquid electrolyte layer 8, and it is thus possible to prevent metal salt deposition in positive electrode 3 and negative electrode 5.

In the third typical example, third aqueous liquid electrolyte layer 8 is in direct contact with negative electrode 5; therefore, those usable as the negative electrode active material in negative electrode 5 include Group 2 elements such as magnesium and calcium, Group 13 elements such as aluminum, transition metals such as zinc, iron, copper and nickel, and alloys and compounds containing these metals and elements which have low reactivity with water.

Figure 5:
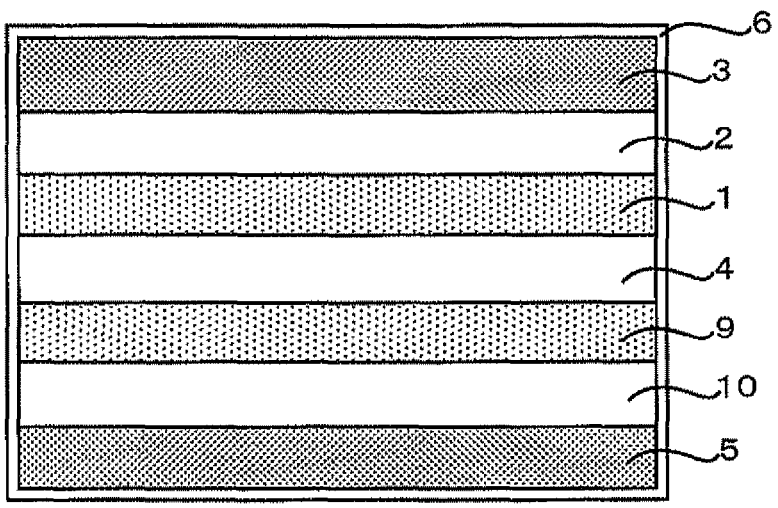
FIG. 5 is a schematic sectional view of the fourth typical example of the battery of the present invention.

FIG. 5 is a schematic sectional view of the fourth typical example of the battery of the present invention. In this fourth typical example, first aqueous liquid electrolyte layer 2 and positive electrode 3 are present in this sequence on a first surface of anion conductor 1, and second aqueous liquid electrolyte layer 4 and negative electrode 5 are present in this sequence on a second surface of anion conductor 1; moreover, second solid electrolyte 9 and non-aqueous liquid electrolyte layer 10 are present in this sequence between second aqueous liquid electrolyte layer 4 and negative electrode 5. The second solid electrolyte is selected from the group consisting of a solid electrolyte with cation-conducting and non-anion-conducting properties and a solid electrolyte with cation-conducting and anion-conducting properties. To retain the liquid electrolyte layers, it is preferable that battery case 6 houses the battery of the present invention.

In the battery of such a structure, by anion conductor 1, it is possible to prevent the metal ions released from negative electrode 5 upon discharge, from reaching positive electrode 3, so that no metal salt produced from the metal ions and anions is dissolved or deposited in first aqueous liquid electrolyte layer 2, and it is thus possible to prevent metal salt deposition in positive electrode 3. In the battery of such a structure, moreover, the anions released from positive electrode 3 upon discharge can only be present at an extremely low concentration in non-aqueous liquid electrolyte layer 10. Therefore, a metal salt produced from the anions and the metal ions released from negative electrode 5 does not dissolve or deposited in non-aqueous liquid electrolyte layer 10 and it is thus possible to prevent the metal salt from depositing in negative electrode 5.

In the fourth typical example, second aqueous liquid electrolyte layer 4 and negative electrode 5 are kept away from each other by second solid electrolyte 9 and non-aqueous liquid electrolyte layer 10. Therefore, those usable as the negative electrode active material in negative electrode 5 include, in addition to the above-mentioned metals with low reactivity with water, metals which have high reactivity with water and are likely to cause self-discharge.

As the second solid electrolyte with cation-conducting and anion-conducting properties, there may be mentioned a porous wall, for example. Specific examples of the porous wall include unglazed porous walls used in Daniel cell technique; anodized porous materials such as porous alumina and porous titania; porous films each comprising zeolite, porous glass, Vycor glass or a polymer such as polyimide; ultrafiltration membranes each comprising polyvinylidene fluoride, polyethylene, polyacrylonitrile or the like; and porous reverse osmosis membranes each comprising cellulose acetate, aromatic polyamide, polyvinyl alcohol, polysulfone or the like.

The non-aqueous liquid electrolyte comprising the non-aqueous liquid electrolyte layer is not particularly limited as long as it is a liquid electrolyte which contains no water and is liquid at normal temperature (15° C. to 25° C.) It is preferable to select the type of non-aqueous liquid electrolyte appropriately, depending on the type of metal ions to be conducted. For example, the non-aqueous liquid electrolyte for lithium air batteries generally contains a lithium salt and a non-aqueous solvent. Examples of the lithium salt include inorganic lithium salts such as $LiPF_6$, $LiBF_4$, $LiClO_4$ and $LiAsF_6$, and organic lithium salts such as $LiCF_3SO_3$, $LiN(SO_2CF_3)_2$(Li-TFSI), $LiN(SO_2C_2F_5)_2$ and $LiC(SO_2CF_3)_3$. Examples of the non-aqueous solvent include ethylene carbonate (EC), propylene carbonate (PC), dimethyl carbonate (DMC), diethyl carbonate (DEC), ethylmethyl carbonate (EMC), ethyl carbonate, butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof. From the point of view that dissolved oxygen can be efficiently used for reaction, the non-aqueous solvent is preferably a solvent with high oxygen solubility. The concentration of the lithium salt in the non-aqueous liquid electrolyte is in the range of 0.5 mol/L to 3 mol/L, for example.

As the non-aqueous liquid electrolyte layer, there may be used a non-aqueous gel electrolyte. A non-aqueous gel electrolyte is generally obtained by adding a polymer to a non-aqueous liquid electrolyte for gelation. For example, the non-aqueous gel electrolyte of a lithium air battery is obtained by adding a polymer such as polyethylene oxide (PEO), polyacrylonitrile (PAN) or polymethyl methacrylate (PMMA) to the non-aqueous liquid electrolyte for gelation. In the present invention, an LiTFSI ($LiN(CF_3SO_2)_2$)-PEO-based non-aqueous gel electrolyte is preferred.

Other specific examples of the non-aqueous liquid electrolyte include an ionic liquid. The ionic liquid is a substance comprising ionic molecules only, each of the molecules being a combination of a cation and an anion. It also refers to a substance that is liquid at room temperature (15° C. to 25° C.).

Cation species of the ionic liquid, which can be used in the present invention, include imidazoliums such as 2-ethylimidazolium, 3-propylimidazolium, 1-ethyl-3-methylimidazolium, 1-butyl-3-methylimidazolium and 1,3-dimethylimidazolium; ammoniums such as diethylmethylammonium, tetrabutylammonium, cyclohexyltrimethylammonium, methyltri-n-octylammonium, triethyl(2-methoxyethoxymethyl) ammonium, benzyldimethyltetradecylammonium and benzyltrimethylamrnonium; and others including alkylpyridinium, dialkylpyrrolidinium, tetraalkylphosphonium, trialkylsulfonium, etc.

Anion species of the ionic liquid, which can be used in the present invention, include halide anions such as $Cl^-$, $Br^-$ and $I^-$; boride anions such as $BF_4^-$, $B(CN)_4^-$ and $B(C_2O_4)_2^-$; amide anions and imide anions such as $(CN)_2N^-$, $[N(CF_3)_2]^-$ and $[N(SO_2CF_3)_2]^-$; sulfate anions and such as $RSO_3^-$ (hereinafter, R refers to an aliphatic hydrocarbon group or aromatic hydrocarbon group), $RSO_4^-$, $R^fSO_3^-$ (hereinafter, $R^f$ refers to a fluorine-containing halogenated hydrocarbon group) and $R^fSO_4^-$; phosphate anions such as $R^f_2P(O)O^-$, $PF_6^-$ and $R_3^fPF_3^-$; antimonate anions such as $SbF_6^-$; and others including lactate anions, nitrate anions, trifluoroacetate anions, etc.

Furthermore, a supporting salt can be dissolved in the ionic liquid. As the supporting salt, there may be mentioned a salt comprising a lithium ion and any of the above anions, such as $LiPF_6$, $LiBF_4$, $LiClO_4$, LiTFSI or LiBETI. Two or more kinds of such supporting salts can be used in combination. The added amount of the supporting salt to the ionic liquid is not particularly limited and is preferably about 0.1 to 1 mol/kg.

The type of the battery of the present invention is not particularly limited as long as the battery has such a structure that the first aqueous liquid electrolyte layer and the positive electrode are present in this sequence on a first surface of the anion conductor, and the second aqueous liquid electrolyte layer and the negative electrode are present in this sequence on a second surface thereof.

Specific examples of the battery of the present invention include a lithium secondary battery, a metal-air battery, a Daniell cell, and a copper-lithium battery comprising lithium as the negative electrode and copper as the positive electrode. When the battery of the present invention is a copper-lithium battery, high voltage can be achieved because of using lithium and copper, which is a combination with a large difference in standard electrode potential.

Hereinafter, the constituents of the battery of the present invention, the positive electrode, negative electrode, anion conductor, aqueous liquid electrolyte layer and other constituents will be described in order.

1. Positive Electrode and Negative Electrode 1-1. Positive Electrode

The positive electrode of the battery of the present invention preferably comprises a positive electrode active material layer comprising a positive electrode active material. In addition to this, it generally comprises a positive electrode current collector and a positive electrode lead that is connected to the positive electrode current collector. When the battery of the present invention is a metal-air battery, in place of the positive electrode, the battery has an air electrode comprising an air electrode layer. The positive electrode or air electrode used in the present invention is preferably an electrode that can be used with general aqueous alkaline liquid electrolytes.

(Positive Electrode Active Material Layer)

An embodiment will be described hereinafter, in which an electrode comprising a positive electrode active material layer is employed as the positive electrode.

For example, when the battery of the present invention is a lithium secondary battery or lithium-air battery, as the positive electrode active material used in the present invention, in particular, there may be mentioned $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$ and $Li_3V_2(PO_4)_3$. Of these, $LiCoO_2$ is preferably used as the positive electrode active material in the present invention.

When the battery of the present invention is a copper-lithium battery, as the positive electrode active material used in the present invention, there may be mentioned copper; copper spinets such as $CuTi_2S_4$ and $CuCr_2S_4$; copper perovskites such as $Cu_2Ta_4O_{12}$; and alloys such as Cu.Au and Cu.Sn.

The thickness of the positive electrode active material layer of the present invention varies depending on the intended application of the battery. However, it is preferably in the range of 10 μm to 250 μm, particularly preferably in the range of 20 μm to 200 μm, most preferably in the range of 30 μm to 150 μm.

The average particle diameter of the positive electrode active material is, for example, in the range of 1 μm to 50 μm, preferably in the range of 1 μm to 20 μm, particularly preferably in the range of 3 μm to 5 μm. This is because it could be difficult to handle the positive electrode active material when the average particle diameter of the material is too small, and it could be difficult to make the positive electrode active material layer a flat layer when the average particle diameter of the positive electrode active material is too large. The average particle diameter of the positive electrode active material can be obtained by, for example, measuring the diameter of active material carrier particles observed with a scanning electron microscope (SEM) and averaging the thus-obtained diameters.

The positive electrode active material layer can comprise an electroconductive material, a binder, etc., as needed.

The electroconductive material contained in the positive electrode active material layer used in the present invention is not particularly limited as long as it is able to increase the electrical conductivity of the positive electrode active material layer. For example, there may be mentioned carbon black such as acetylene black and ketjen black. The content of the electroconductive material in the positive electrode active material layer varies depending on the type of electroconductive material, and it is normally in the range of 1% by mass to 10% by mass.

As the binder contained in the positive electrode active material layer used in the present invention, there may be mentioned polyvinylidene fluoride (PVDF) and polytetrafluoroethylene (PTFE), for example. The content of the binder in the positive electrode active material layer is only needed to be an amount which can fix the positive electrode active material, etc., and it is preferably as small as possible. The content of the binder is normally in the range of 1% by mass to 10% by mass.

In addition to the positive electrode active material, the positive electrode active material layer can contain an electrolyte for the positive electrode. In this case, as the electrolyte for the positive electrode, there may be used a solid electrolyte such as a solid oxide electrolyte or solid sulfide electrolyte, a polymer electrolyte, a gel electrolyte or the like.

(Positive Electrode Current Collector)

The positive electrode current collector used in the present invention functions to collect current from the positive electrode active material layer. As the material for the positive electrode current collector, for example, there may be mentioned aluminum, stainless steel (SUS), nickel, iron and titanium. Among them, aluminum and SUS are preferred. As the form of the positive electrode current collector, there may be mentioned a foil form, a plate form and a mesh form, for example. Among them, a foil form is preferred.

The method for producing the positive electrode used in the present invention is not particularly limited as long as it is a method that gives the above-mentioned positive electrode. After the positive electrode active material layer is formed, the layer can be pressed to increase electrode density.

(Air Electrode)

An embodiment will be described hereinafter, in which an air electrode comprising an air electrode layer is employed as the positive electrode.

The air electrode of the battery of the present invention preferably comprises an air electrode layer. In addition to this, it generally comprises an air electrode current collector and an air electrode lead that is connected to the air electrode current collector.

(Air Electrode Layer)

The air electrode layer of the battery of the present invention comprises at least an electroconductive material. In addition, it can contain at least one of a catalyst and a binder as needed.

The electroconductive material used for the air electrode layer is not particularly limited as long as it is electroconductive. For example, there may be mentioned a carbon material, a perovskite-type electroconductive material, a porous electroconductive polymer and a porous metal material. Especially, the carbon material can be porous or non-porous. It is preferably porous in the present invention, so that it has a large specific surface area and offers many reaction sites. As the porous carbon material, in particular, there may be mentioned mesoporous carbon, etc. As the non-porous carbon material, in particular, there may be mentioned graphite, acetylene black, carbon nanotube, carbon fiber, etc. The content of the electroconductive material in the air electrode layer is in the range of 65% by mass to 99% by mass for example, preferably in the range of 75% by mass to 95% by mass. This is because when the electroconductive material content is too small, the area of reaction sites is decreased and battery capacity could be decreased, and when the electroconductive material content is too large, the content of the catalyst becomes relatively small and poor catalyst performance could be obtained.

As the catalyst used for the air electrode layer, there may be used an oxygen-activating catalyst, for example. Examples of the oxygen-activating catalyst include platinum group metals such as nickel, palladium and platinum; perovskite-type oxides comprising a transition metal such as cobalt, manganese or iron; inorganic compounds comprising oxides of noble metals such as ruthenium, iridium or palladium; metal coordinated organic compounds having a porphyrin skeleton or phthalocyanine skeleton; and manganese oxide. The content of the catalyst in the air electrode layer is, for example, in the range of 1% by mass to 30% by mass, preferably in the range of 5% by mass to 20% by mass. This is because when the catalyst content is too small, poor catalyst performance could be obtained, and when the catalyst content is too large, the electroconductive material content becomes relatively small, so that the area of reaction sites is decreased and battery capacity could be decreased.

From the viewpoint of smooth electrode reaction, the catalyst is preferably supported by the electroconductive material.

The air electrode layer is needed to contain at least the electroconductive material. However, it is more preferable that the air electrode layer further contains a binder for fixing the electroconductive material. As the binder, for example, there may be mentioned polyvinylidene fluoride (PVDF), polytetrafluoroethylene (PTFE) and a rubber-based resin such as styrene-butadiene rubber (SBR). The content of the binder in the air electrode layer is not particularly limited. However, it is 30% by mass or less for example, preferably in the range of 1% by mass to 10% by mass.

The thickness of the air electrode layer varies depending on the intended application of the air battery, etc. The thickness is in the range of 2 μm to 500 μm for example, preferably in the range of 5 μm to 300 μm.

(Air Electrode Current Collector)

The air electrode current collector of the battery of the present invention functions to collect current from the air electrode layer. The material for the air electrode current collector is not particularly limited as long as it is electroconductive. For example, there may be mentioned stainless-steel, nickel, aluminum, iron, titanium and carbon. As the form of the air electrode current collector, there may be mentioned a foil form, a plate form and a mesh (grid) form, for example. Of these, in the present invention, the air electrode current collector is preferably in a mesh form from the viewpoint of excellent current collection efficiency. In this case, normally, the air electrode current collector in a mesh form is provided inside the air electrode layer. In addition, the battery of the present invention can comprise a different air electrode current collector (such as a current collector in a foil form) that collects current collected by the air electrode current collector in a mesh form. Also in the present invention, the below-described battery case may also function as the air electrode current collector.

The thickness of the air electrode current collector is in the range of 10 μm to 1,000 μm for example, preferably in the range of 20 μm to 400 μm.

1-2. Negative Electrode

The negative electrode of the battery of the present invention comprises a negative electrode active material layer which comprises a negative electrode active material that is able to release metal ions upon discharge. In addition to this, the negative electrode generally comprises a negative electrode current collector and a negative electrode lead that is connected to the negative electrode current collector.

(Negative Electrode Active Material Layer)

The negative electrode active material contained in the negative electrode active material layer used in the present invention is not particularly limited as long as it is able to release metal ions upon discharge. Specific examples thereof include alkali metals such as lithium, sodium and potassium; Group 2 elements such as magnesium and calcium; Group 13 elements such as aluminum; transition metals such as zinc, iron, copper and nickel; and alloys and compounds containing these metals.

Examples of lithium-containing negative electrode active materials include metals, alloys, metal oxides and metal nitrides. Examples of lithium-containing alloys include a lithium-aluminum alloy, a lithium-tin alloy, a lithium-lead alloy and a lithium-silicon alloy. Examples of lithium-containing metal oxides include a lithium-titanium oxide. Examples of lithium-containing metal nitrides include a lithium-cobalt nitride, a lithium-iron nitride and a lithium-manganese nitride.

The negative electrode active material layer may be one comprising a negative electrode active material only or one comprising a negative electrode active material and at least one of an electroconductive material and a binder. For example, when the negative electrode active material is in a foil form, the negative electrode active material layer can be one comprising the negative electrode active material only. When the negative electrode active material is in a powder form, the negative electrode active material layer can be one comprising the negative electrode active material and a binder. Since the electroconductive material and binder are the same as those described above under "Air electrode," they will not be described here.

In addition to the negative electrode active material, the negative electrode active material layer can contain an electrolyte for the negative electrode. In this case, as the electrolyte for the negative electrode, there may be used a solid electrolyte such as a solid oxide electrolyte or solid sulfide electrolyte, a polymer electrolyte, a gel electrolyte, or the like.

(Negative Electrode Current Collector)

The material of the negative electrode current collector in the battery of the present invention is not particularly limited as long as it has electrical conductivity. Examples of the material include copper, stainless steel, nickel and carbon. As the form of the negative electrode current collector, there may be mentioned a foil form, a plate form and a mesh (grid) form, for example. In the present invention, the below-described battery case may also function as the negative electrode current collector.

2. Anion Conductor

The anion conductor used in the present invention is not particularly limited as long as it can selectively transport anions. Specific examples thereof include polyelectrolyte membranes such as one obtained by introducing a hydroxyl group in a hydrocarbon-based polymer and one obtained by subjecting the hydrocarbon-based polymer to hydroxide ion exchange, examples of the hydrocarbon-based polymer including engineering plastics such as polyether ether ketone, polyether ketone, polyether sulfone, polyphenylene sulfide, polyphenylene ether and polyparaphenylene, and general-purpose plastics such as polyethylene, polypropylene and polystyrene. Specific examples of such polyelectrolyte membranes include anion-type electrolyte materials manufactured by Tokuyama Corporation.

3. Aqueous Liquid Electrolyte Layer

The aqueous liquid electrolyte layer of the battery of the present invention is formed at least between the positive electrode and the anion conductor, and between the anion conductor and the negative electrode. It is a layer which is responsible for conduction of metal ions released from the negative electrode and anions released from the positive electrode.

The aqueous liquid electrolyte used for the battery of the present invention will be described hereinafter, taking a lithium-air battery as an example.

As the aqueous liquid electrolyte, a mixture of water and a lithium salt is generally used. Specific examples of the lithium salt include inorganic lithium salts such as $LiPF_6$, $LiBF_4$, $LiClO_4$ and $LiAsF_6$, and organic lithium salts such as $LiCF_3SO_3$, $LiN(SO_2CF_3)_2$(Li-TFSI), $LiN(SO_2C_2F_5)_2$ and $LiC(SO_2CF_3)_3$.

The concentration of LiOH in the aqueous liquid electrolyte is 0 to 5.12 M. The LiOH saturation concentration of the aqueous liquid electrolyte at room temperature is 5.12 M. However, a remarkable decrease in lithium ion conductivity is shown at an electrolyte concentration of less than 0.1 M, so that it is possible to also add KOH or NaOH at a concentration of about 0.1 to 12 M, in order to compensate battery activity in the LiOH concentration range.

In the present invention, as the aqueous liquid electrolyte, a low-volatile liquid such as an ionic liquid can be contained.

4. Other Constituents

The battery of the present invention can comprise a separator and a battery case as other constituents.

(Separator)

When the battery of the present invention has a structure of stacking a plurality of stacks, each of which having a structure in which the first aqueous liquid electrolyte layer and the positive electrode are present in this sequence on a first surface of the anion conductor, and the second aqueous liquid electrolyte layer and the negative electrode are present in this sequence on a second surface of the anion conductor, it is preferable from the viewpoint of safety to provide a separator between the positive and negative electrodes, each of which belongs to a different laminate. Examples of the separator include a porous film made of polyethylene, polypropylene or the like, and a nonwoven fabric such as resin nonwoven fabric and glass fiber nonwoven fabric.

(Battery Case)

The battery of the present invention generally comprises a battery case for housing the positive electrode, the negative electrode, the anion conductor, the aqueous liquid electrolyte layer, etc. As the form of the battery case, in particular, there may be mentioned a coin form, a plate form, a cylinder form and a laminate form, for example.

When the battery of the present invention is a metal-air battery, the battery case can be an open battery case or closed battery case. The open battery case is a battery case having a structure in which at least the air electrode layer can be in full contact with the air. On the other hand, when the battery case is a closed battery case, the closed battery case is preferably provided with a gas (air) inlet tube and a gas (air) outlet tube. In this case, the introduced and emitted gases preferably have a high oxygen concentration and are more preferably pure oxygen. Upon discharging, it is preferable to increase the oxygen concentration. Upon charging, it is preferable to decrease the oxygen concentration.

A method for producing the battery of the present invention is not particularly limited as long as the method can form a stacking structure in which the first aqueous liquid electrolyte layer and the positive electrode are present in this sequence on a first surface of the anion conductor, and the second aqueous liquid electrolyte layer and the negative electrode are present in this sequence on a second surface of the anion conductor. However, when the battery of the present invention is a metal-air battery, from the viewpoint of preventing the air electrode from complete immersion in the liquid electrolyte and thus protecting oxygen supply paths of the air electrode, it is preferable to stack the negative electrode, second aqueous liquid electrolyte layer, anion conductor, first aqueous liquid electrolyte layer, and air electrode in this sequence from the bottom of the battery case. By stacking them in this way, the air electrode is positioned on the top of the stacking structure; therefore, it is possible to prevent gravity-induced permeation of the aqueous liquid electrolyte into the air electrode and thus to prevent pores of the air electrode from being completely clogged.

REFERENCE SIGNS LIST

1. Anion conductor
2. First aqueous liquid electrolyte layer
3. Positive electrode
4. Second aqueous liquid electrolyte layer 5. Negative electrode
6. Battery case
7. First solid electrolyte with cation-conducting and non-anion-conducting properties
8. Third aqueous liquid electrolyte layer
9. Second solid electrolyte
10. Non-aqueous liquid electrolyte layer

The invention claimed is:

1. A battery comprising an anion conductor, a positive electrode, a negative electrode, a first aqueous liquid electrolyte layer and a second aqueous liquid electrolyte layer,
wherein the first aqueous liquid electrolyte layer and the positive electrode are present in this sequence on a first surface of the anion conductor, and the first aqueous liquid electrolyte layer is in contact with the first surface of the anion conductor, and the second aqueous liquid electrolyte layer and the negative electrode are present in this sequence on a second surface of the anion conductor, and the second aqueous liquid electrolyte layer is in contact with the second surface of the anion conductor;
wherein the negative electrode comprises a negative electrode active material layer, and the negative electrode active material layer comprises a negative electrode active material which can release a metal ion upon discharging;
wherein the anion conductor has anion-conducting and non-cation-conducting properties; and
wherein a first solid electrolyte with cation-conducting and non-anion-conducting properties is present between the second aqueous liquid electrolyte layer and the negative electrode.

2. The battery according to claim 1, wherein a third aqueous liquid electrolyte layer is present between the first solid electrolyte and the negative electrode.

3. The battery according to claim 1, being a metal-air battery.

4. The battery according to claim 1,
wherein the negative electrode active material layer comprises lithium as the negative electrode active material, and
wherein the positive electrode comprises a positive electrode active material layer, and the positive electrode active material layer comprises copper as the positive electrode active material.

* * * * *